(12) United States Patent
Yamasaki et al.

(10) Patent No.: US 11,822,714 B2
(45) Date of Patent: Nov. 21, 2023

(54) ELECTRONIC DEVICE AND CONTROL METHOD FOR CAPTURING AN IMAGE OF AN EYE

(71) Applicant: CANON KABUSHIKI KAISHA, Tokyo (JP)

(72) Inventors: Ryo Yamasaki, Tokyo (JP); Hiroshi Kudo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/316,409

(22) Filed: May 10, 2021

(65) Prior Publication Data

US 2021/0357027 A1    Nov. 18, 2021

(30) Foreign Application Priority Data

May 15, 2020 (JP) ................................. 2020-085960
Mar. 26, 2021 (JP) ................................. 2021-052724

(51) Int. Cl.
*G06F 3/01* (2006.01)
*G06T 7/70* (2017.01)
*H04N 23/60* (2023.01)
*H04N 23/63* (2023.01)

(52) U.S. Cl.
CPC ............... *G06F 3/013* (2013.01); *G06T 7/70* (2017.01); *H04N 23/635* (2023.01); *H04N 23/64* (2023.01)

(58) Field of Classification Search
CPC ....... G06F 3/013; G06T 7/70; H04N 5/23222; H04N 5/232945; H04N 5/232; H04N 5/232122; H04N 5/23216; H04N 5/2251; H04N 5/2254; H04N 5/23219; H04N 23/635; H04N 23/64; H04N 23/60; H04N 23/62; H04N 23/672; H04N 23/50; H04N 23/55; H04N 23/611; G03B 2213/025; G03B 13/06; G03B 13/36; G06V 2201/03; G06V 40/18
USPC ....................................................... 348/333.03
See application file for complete search history.

(56) References Cited

U.S. PATENT DOCUMENTS

| | | | |
|---|---|---|---|
| 7,963,652 B2 * | 6/2011 | Vertegaal | A61B 3/113 351/205 |
| 2012/0002843 A1 * | 1/2012 | Yoda | B60K 28/06 382/103 |
| 2015/0009313 A1 * | 1/2015 | Noda | A61B 5/117 348/78 |
| 2016/0048735 A1 * | 2/2016 | Ohya | G06T 7/90 348/78 |
| 2018/0039327 A1 * | 2/2018 | Noda | H04N 23/64 |

FOREIGN PATENT DOCUMENTS

JP        2018032198 A        3/2018

\* cited by examiner

*Primary Examiner* — Usman A Khan
(74) *Attorney, Agent, or Firm* — Canon U.S.A., Inc. IP Division

(57) ABSTRACT

An electronic device is configured to obtain an eye image in which an eye that looks at a display is captured. The electronic device includes at least one memory storing instructions; and at least one processor which executes the stored instructions causing the at least one processor to: perform line-of-sight detection, based on the obtained eye image; and provide, based on at least one of a position of a pupil image in the eye image and a number of corneal reflection images in the eye image, a predetermined notification regarding a method of adjusting a viewing state in which the display is visually perceived.

19 Claims, 13 Drawing Sheets

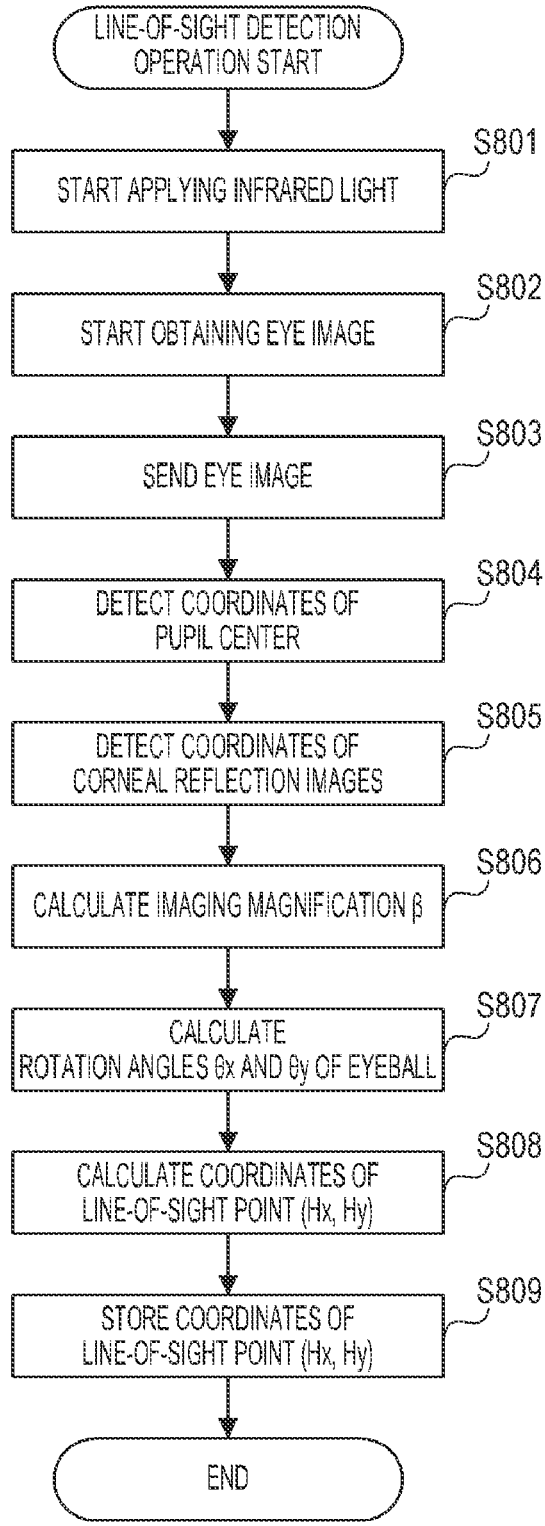

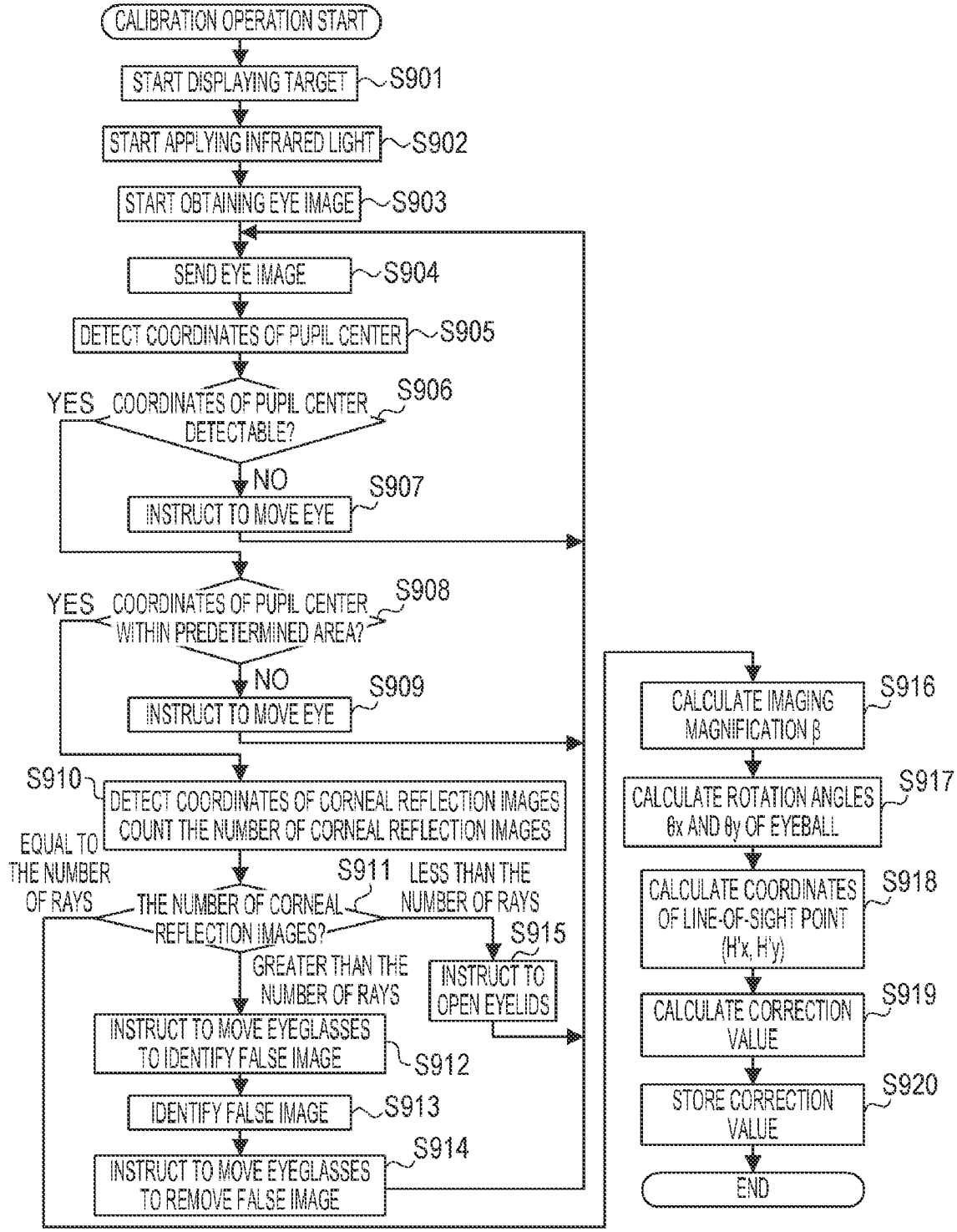

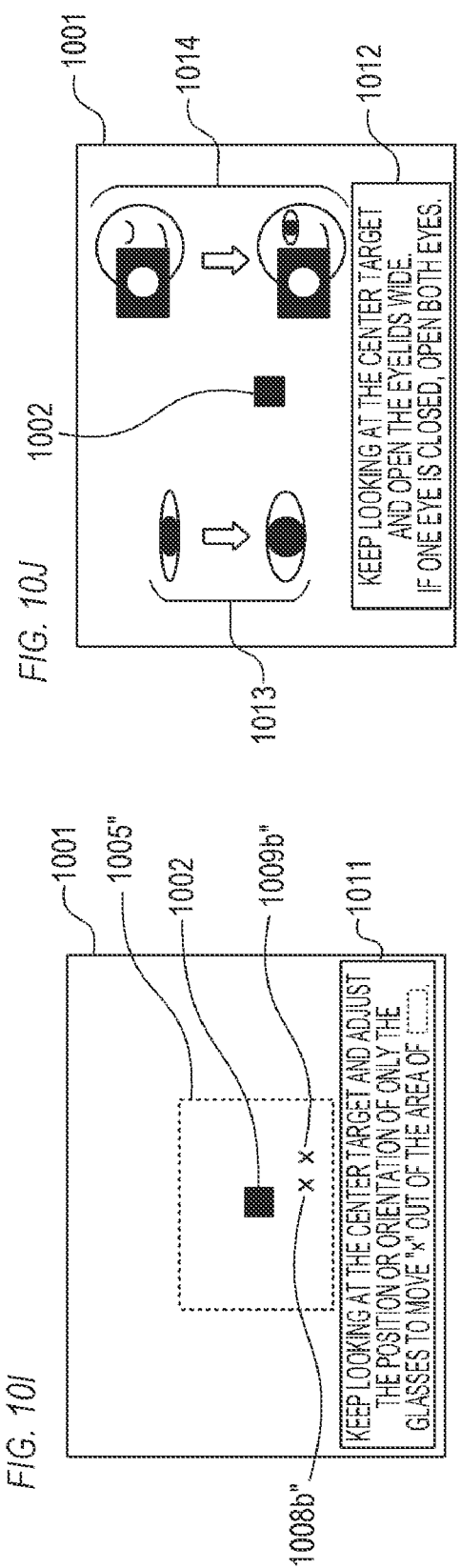

ELECTRONIC DEVICE AND CONTROL METHOD FOR CAPTURING AN IMAGE OF AN EYE

BACKGROUND

Field of the Invention

The present disclosure relates to an electronic device having a line-of-sight detection function.

Description of the Related Art

Cameras (including video cameras) that can detect the line of sight (line-of-sight direction) of a user with a line-of-sight detection function and can select a focus point on the basis of the line-of-sight detection result exist.

Japanese Patent Application Publication No. 2018-32198 discloses a technique of displaying an image of a user eye on a display device. The user can adjust the position of the face, the orientation of the face, the position of eyeglasses, the orientation of the eyeglasses, or the like, based on the eye image in order to limit reduction in line-of-sight detection accuracy, which may be caused by unnecessary light such as the light reflected on the eyeglasses.

However, with the conventional technique disclosed in Japanese Patent Application Publication No. 2018-32198, a user who is unfamiliar with the line-of-sight detection function may not be able to easily determine a specific adjustment method for preventing the reduction in the line-of-sight detection accuracy, thus failing to perform an adjustment easily. As a result, the eye may be positioned outside the line-of-sight detection area (the area in which the line-of-sight detection can be performed), or unnecessary light such as the light reflected on the eyeglass cannot be removed. This reduces the line-of-sight detection accuracy.

SUMMARY

The present disclosure provides an electronic device that allows a user to easily adjust the position of the face, the orientation of the face, the position of eyeglasses, the orientation of the eyeglasses, or the like, and is thus capable of performing line-of-sight detection with high accuracy.

An electronic device is configured to obtain an eye image in which an eye that looks at a display is captured. The electronic device includes at least one memory storing instructions; and at least one processor which executes the stored instructions causing the at least one processor to: perform line-of-sight detection, based on the obtained eye image; and provide, based on at least one of a position of a pupil image in the eye image and a number of corneal reflection images in the eye image, a predetermined notification regarding a method of adjusting a viewing state in which the display is visually perceived.

Further features of the present disclosure will become apparent from the following description of exemplary embodiments with reference to the attached drawings.

BRIEF DESCRIPTION OF THE DRAWINGS

FIG. 8 is a flowchart of a line-of-sight detection operation according to the present embodiment.

FIG. 9 is a flowchart of a calibration operation according to the present embodiment.

FIGS. 10A, 10B, 10E, 10G, 10I, and 10J are diagrams showing display images according to the present embodiment.

DESCRIPTION OF THE EMBODIMENTS

Embodiment

Description of Configuration

Figure 1A:
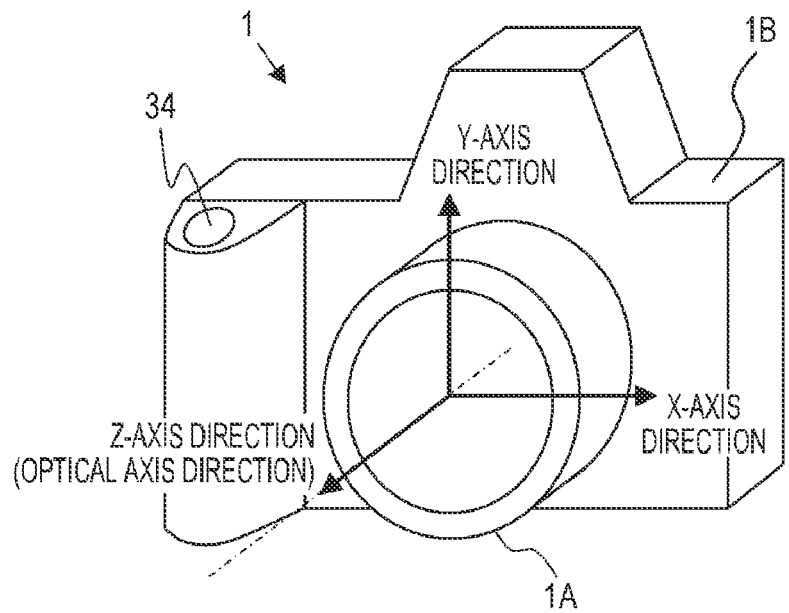
FIGS. 1A and 1B are external views of a camera according to a present embodiment.
Figure 1B:
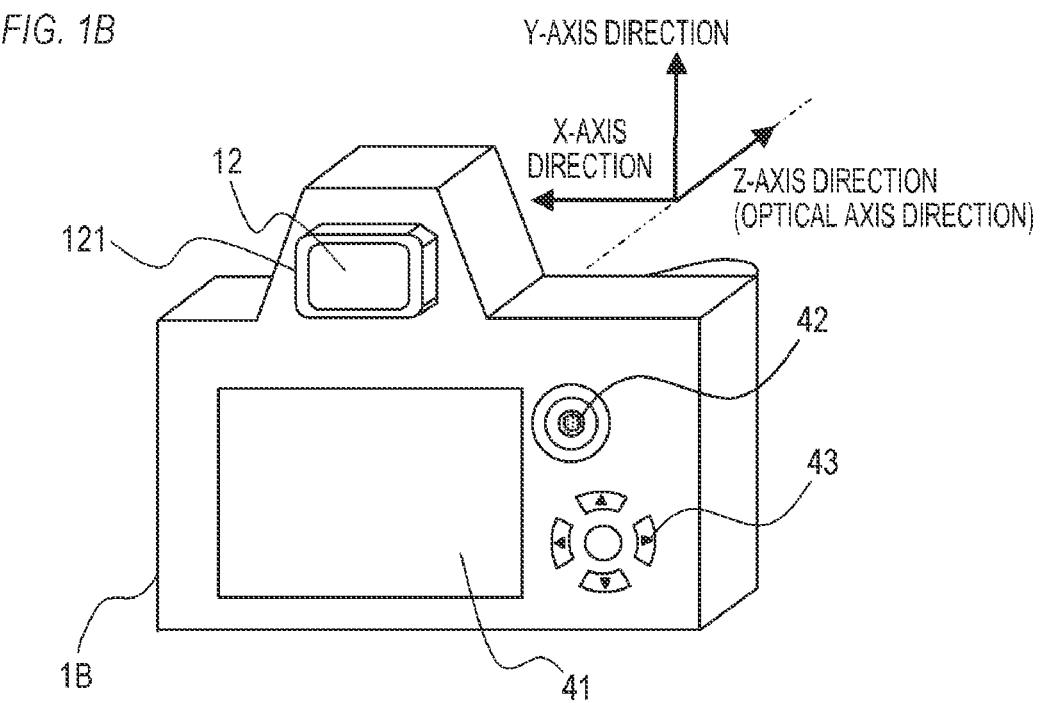

FIGS. 1A and 1B show the appearance of a camera 1 (digital still camera; camera with interchangeable lens) according to the present embodiment. The present disclosure is also applicable to a device that displays information, such as images and text, and any electronic device that can detect the line of sight of a user who visually perceives an optical image through an eyepiece optical system. Examples of these electronic devices include mobile phones, game consoles, tablet terminals, personal computers, information terminals in the form of a watch or eyewear, head-mounted displays, and binoculars. The present disclosure is applicable to any electronic devices capable of obtaining an image of the eye looking at the display.

FIG. 1A is a front perspective view, and FIG. 1B is a back perspective view. As shown in FIG. 1A, the camera 1 has a photographic lens unit 1A and a camera housing 1B. The camera housing 1B includes a release button 34, which is an operation member that receives an image-capturing operation of a user (photographer). As shown in FIG. 1B, the back side of the camera housing 1B includes an eyepiece window frame 121, through which the user looks into a display panel 6 inside the camera housing 1B. The display panel 6 will be described below. The eyepiece window frame 121 forms a view port 12 and projects outward (toward the back) with respect to the camera housing 1B. The back side of the camera housing 1B also includes operation members 41 to 43, which receive various operations from the user. For example, the operation member 41 is a touch panel that receives touch operations, the operation member 42 is an operation lever that can be pressed to tilt in different directions, and the operation member 43 is a four-way key that can be pushed for four directions. The operation member 41 (touch panel) includes a display panel such as a liquid crystal panel, and has a function of displaying images on the display panel.

Figure 2:
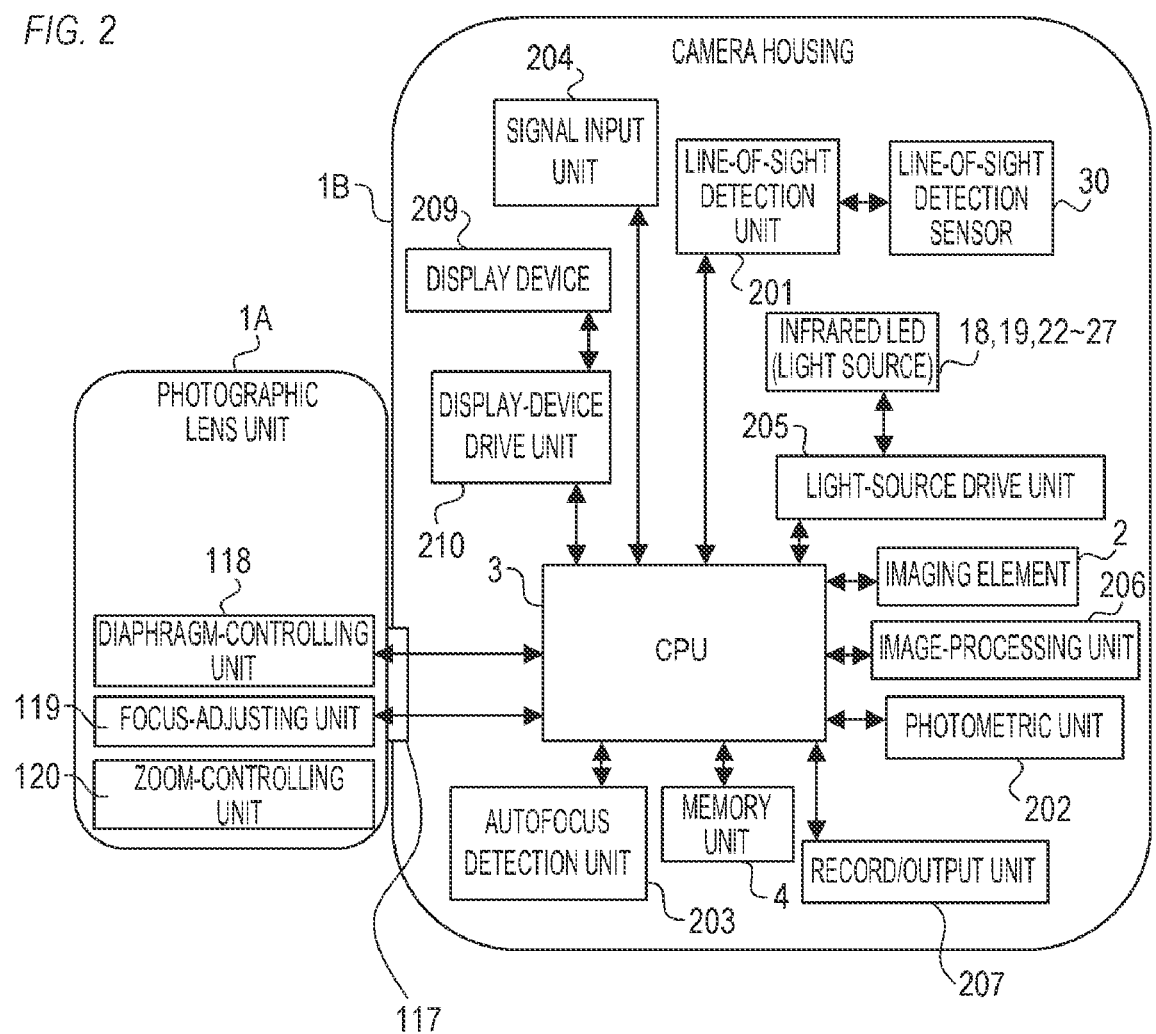
FIG. 2 is a block diagram of the camera according to the present embodiment.

FIG. 2 is a block diagram showing the configuration of the camera 1.

An imaging element 2 may be an imaging device, such as a CCD or CMOS sensor. The optical system of the photographic lens unit 1A forms an optical image on the image plane of the imaging element 2. The imaging element 2 photoelectrically converts this optical image and outputs the obtained analog image signal to an A/D conversion unit (not shown). The A/D conversion unit performs analog-to-digital conversion of the analog image signal obtained by the imaging element 2 and outputs the converted signal as image data.

The photographic lens unit 1A consists of an optical system including a zoom lens, a focus lens, and a diaphragm. When mounted to the camera housing 1B, the photographic lens unit 1A guides light from the object to the imaging element 2 and forms an object image on the image plane of the imaging element 2. A diaphragm-controlling unit 118, a focus-adjusting unit 119, and a zoom-controlling unit 120 each receive an instruction signal from a CPU 3 via a mount contact 117, and drive and control the diaphragm, focus lens, and zoom lens according to the instruction signal.

The CPU 3 in the camera housing 1B reads a control program for blocks of the camera housing 1B from a ROM of a memory unit 4, loads the control program into a RAM of the memory unit 4, and executes the control program. The CPU 3 thus controls the operation of the blocks of the camera housing 1B. The CPU 3 is connected to a line-of-sight detection unit 201, a photometric unit 202, an autofocus detection unit 203, a signal input unit 204, a display-device drive unit 210, and a light-source drive unit 205, for example. The CPU 3 transmits signals to the diaphragm-controlling unit 118, the focus-adjusting unit 119, and the zoom-controlling unit 120, which are arranged in the photographic lens unit 1A, via the mount contact 117. In the present embodiment, the memory unit 4 has a function of storing imaging signals received from the imaging element 2 and a line-of-sight detection sensor 30.

The line-of-sight detection unit 201 performs analog-to-digital conversion on the output (eye image of an eye) that is produced by the line-of-sight detection sensor 30 when an image of an eyeball is formed on the line-of-sight detection sensor 30. The result of the conversion is sent to the CPU3. The CPU 3 extracts characteristic points required for line-of-sight detection from the eye image according to a predetermined algorithm, which will be described below, and calculates the user's line of sight (the line-of-sight point in an image for visual perception) from the positions of the characteristic points.

The photometric unit 202 performs processing such as amplification, logarithmic compression, and A/D conversion on the signal obtained from the imaging element 2, which also serves as a photometric sensor. This signal is a brightness signal corresponding to the brightness of the object field. The result of the processing is sent to the CPU 3 as field brightness information.

The autofocus detection unit 203 performs analog-to-digital conversion on the signal voltages received from a plurality of detection elements (a plurality of pixels), which is provided in the imaging element 2 (such as a CCD) to detect phase difference. The converted voltages are sent to the CPU 3. Based on the signals received from the detection elements, the CPU 3 calculates the distance to the object corresponding to the focus detection points. This is a conventional technique known as image-plane phase-detection AF. For example, it is assumed in the present embodiment that the field image (image for visual perception) in the viewfinder is divided and there is a focus detection point at each of 180 different locations on the image plane.

The light-source drive unit 205 drives infrared LEDs 18, 19, 22 to 27, which will be described below, based on a signal (instruction) from the CPU 3.

An image-processing unit 206 performs various image processing on the image data stored in the RAM. The image-processing unit 206 performs various image processing for developing, displaying and recording digital image data, such as correction of pixel defects caused by the optical system or the imaging element, demosaicing, white balance correction, color interpolation, and gamma processing.

The signal input unit 204 is connected to a switch SW1 and a switch SW2. The switch SW1 is a switch for starting operations of the camera 1 such as photometry, distance measurement, and line-of-sight detection, and is turned on by the first stroke of the release button 34. The switch SW2 is a switch for starting an image-capturing operation, and is turned on by the second stroke of the release button 34. The ON signals from the switches SW1 and SW2 are input to the signal input unit 204 and transmitted to the CPU3. The signal input unit 204 also receives operation inputs from the operation member 41 (touch panel), operation member 42 (operation lever), and operation member 43 (four-way key) shown in FIG. 1B.

A record/output unit 207 records data including image data on a recording medium such as a removable memory card, and outputs the data to an external device via an external interface.

A display-device drive unit 210 drives a display device 209 based on a signal from the CPU 3. The display device 209 includes display panels 5 and 6, which will be described below.

Figure 3:
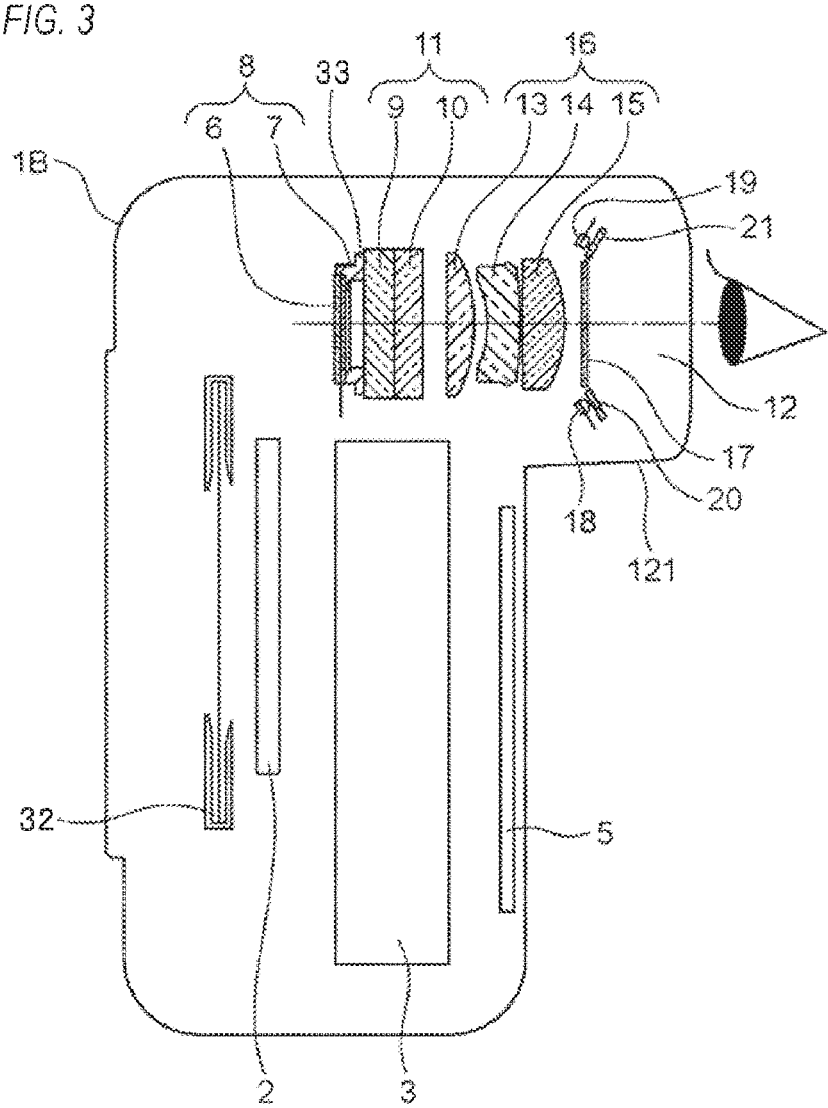
FIG. 3 is a cross-sectional view of the camera according to the present embodiment.

FIG. 3 is a cross-sectional view of the camera 1 taken along an YZ plane along the Y-axis and the Z-axis shown in FIG. 1A. This diagram conceptually illustrates the configuration of the camera 1.

A shutter 32 and the imaging element 2 are arranged side by side in the optical axis direction of the photographic lens unit 1A.

The back side of the camera housing 1B includes the display panel 5, which displays menus and images for operating the camera 1 and viewing and editing images obtained by the camera 1. The display panel 5 may be a backlit liquid crystal panel or an organic EL panel, for example.

The EVF provided in the camera housing 1B has a function of a general EVF that displays menus and images like the display panel 5. In addition, the EVF is capable of detecting the line of sight of the user who is looking into the EVF, allowing the control of the camera 1 to reflect the detection result.

When the user is looking into the viewfinder, the display panel 6 performs similar display as the display panel 5 (menu display and image display for operating the camera 1 and viewing/editing images obtained by the camera 1). The display panel 6 may be a backlit liquid crystal panel or an organic EL panel, for example. As with the images captured with a general camera, the display panel 6 has the shape of a rectangle that is longer in the X-axis direction (horizontal direction) than in the Y-axis direction (vertical direction), and has a ratio of 3:2, 4:3, or 16:9, for example.

A panel holder 7 holds the display panel 6. The display panel 6 and the panel holder 7 are bonded to each other and form a display panel unit 8.

A first optical-path dividing prism 9 and a second optical-path dividing prism 10 are affixed and bonded to each other to form an optical-path dividing prism unit 11 (optical-path dividing member). The optical-path dividing prism unit 11 guides the light from the display panel 6 to the eyepiece window 17 provided in the view port 12, and guides the light from the eyepiece window 17 to the line-of-sight detection sensor 30 in the opposite direction. The light from the eyepiece window 17 includes light reflected on the eye (pupil).

The display panel unit 8 and the optical-path dividing prism unit 11 are fixed and integrally formed with a mask 33 interposed in between.

The eyepiece optical system 16 includes a G1 lens 13, a G2 lens 14, and a G3 lens 15.

The eyepiece window 17 is a transparent member that transmits visible light. The image displayed on the display panel unit 8 is observed through the optical-path dividing prism unit 11, the eyepiece optical system 16, and the eyepiece window 17.

Illumination windows 20 and 21 are windows for hiding the infrared LEDs 18, 19, 22 to 27 so that they cannot be seen from the outside. The illumination windows 20 and 21 are made of a resin that absorbs visible light and transmits infrared light.

Figure 4A:
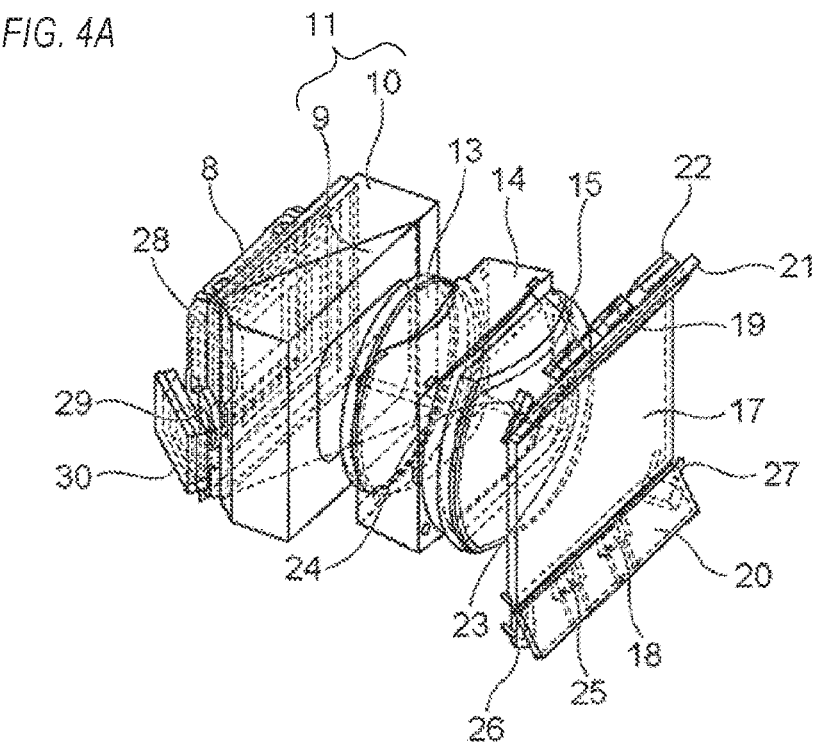
FIGS. 4A and 4B are diagrams showing the EVF portion of the camera according to the present embodiment.
Figure 4B:
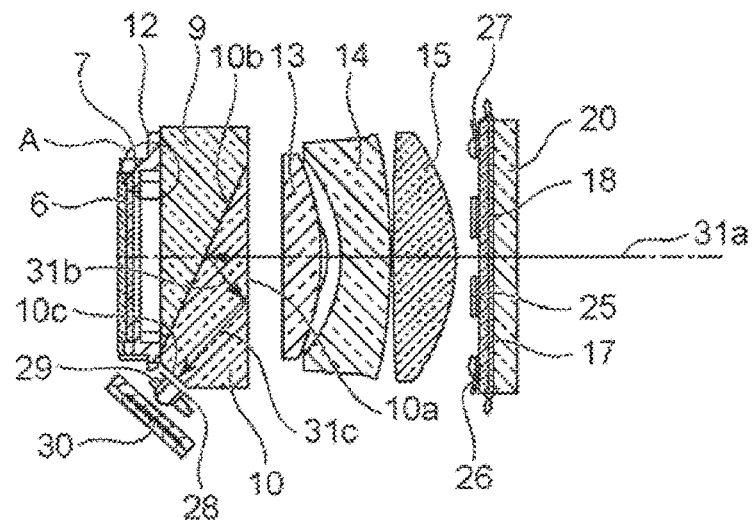

FIG. 4A is a perspective view showing the configuration of the EVF portion of the camera 1. FIG. 4B is a cross-sectional view of the optical axis of the EVF portion.

The infrared LEDs 18, 19, 22 to 27 are light sources that emit infrared light. The infrared LEDs 18, 19, 23, and 25 are infrared LEDs for short-distance illumination. The infrared LEDs 22, 24, 26, and 27 are infrared LEDs for long-distance illumination. Light sources other than infrared LEDs may also be used.

A line-of-sight detection optical system, including the diaphragm 28 and a line-of-sight imaging lens 29, guides the infrared reflection light guided through the optical-path dividing prism unit 11 from the eyepiece window 17 to the line-of-sight detection sensor 30. The line-of-sight detection sensor 30 is a solid-state image sensor such as a CCD or CMOS.

For example, light from at least one of the infrared LEDs 18, 19, 22 to 27 is applied to the eyeball of the user looking into the viewfinder. In this case, as indicated by an optical path 31a in FIG. 4B, the optical image (eyeball image) of the eyeball illuminated with the light passes through the eyepiece window 17, the G3 lens 15, the G2 lens 14, and the G1 lens 13, and enters the second optical-path dividing prism 10 from a second surface 10a of the second optical-path dividing prism 10.

A dichroic film that reflects infrared light is formed on a first surface 10b of the second optical-path dividing prism. As indicated by a reflection optical path 31b, the eyeball image that enters the second optical-path dividing prism 10 is reflected on the first surface 10b toward the second surface 10a.

Then, as indicated by an imaging optical path 31c, the reflected eyeball image is totally reflected on the second surface 10a, exits the second optical-path dividing prism 10 through a third surface 10c of the second optical-path dividing prism 10, passes through the diaphragm 28, and is formed on the line-of-sight detection sensor 30 via the line-of-sight imaging lens 29. In addition to this eyeball image, the line-of-sight detection also uses a corneal reflection image, which is formed by specular reflection of light from an infrared LED on the cornea.

Figure 5:
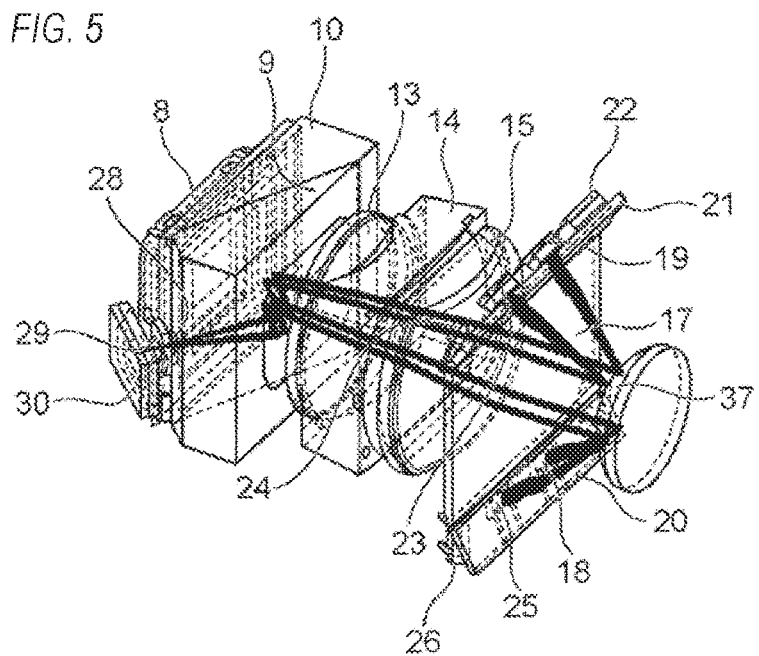
FIG. 5 is a diagram showing optical paths of light emitted by infrared LEDs according to the present embodiment.

FIG. 5 shows an example of optical paths through which light emitted from infrared LEDs 18, 19, 23, and 25 for short-distance illumination is specularly reflected on the cornea 37 of an eyeball and received by the line-of-sight detection sensor 30.

Description of Line-of-Sight Detection Operation

Figure 6:
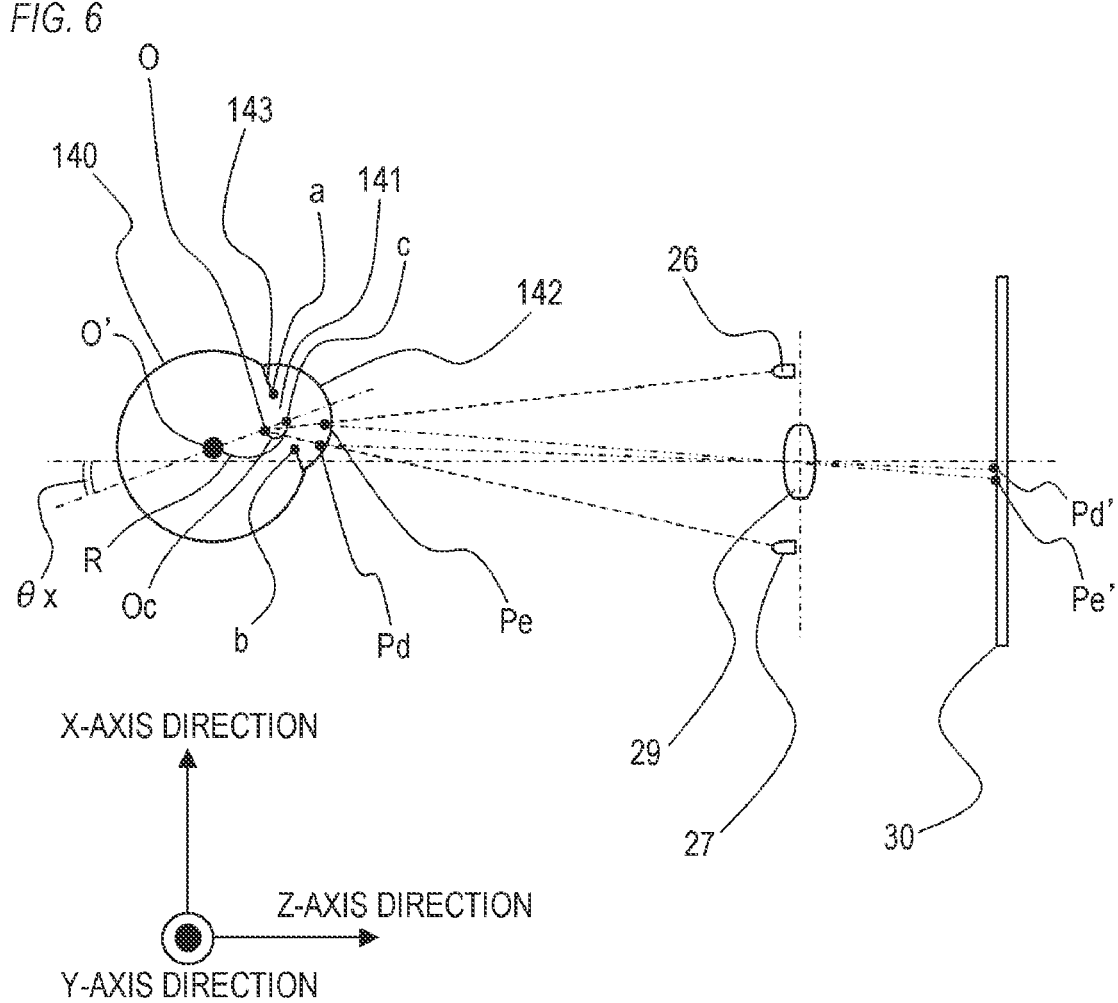
FIG. 6 is a diagram for illustrating the principle of a line-of-sight detection method according to the present embodiment.

Referring to FIGS. 6, 7A, 7B, and 8, a method for detecting a line-of-sight is now described. The following example uses the infrared LEDs 26 and 27, but the same method may be used when other infrared LEDs 18, 19, 22 to 25 are used. FIG. 6 is a schematic view of an optical system for line-of-sight detection, illustrating the principle of the line-of-sight detection method. As shown in FIG. 6, the infrared LEDs 26 and 27 apply infrared light to the user's eyeball 140. Part of the infrared light emitted from the infrared LEDs 26 and 27 and reflected on the eyeball 140 forms images near the line-of-sight detection sensor 30 via the line-of-sight imaging lens 29. In FIG. 6, the positions of the infrared LEDs 26 and 27, the line-of-sight imaging lens 29, and the line-of-sight detection sensor 30 are adjusted to facilitate the understanding of the principle of line-of-sight detection.

Figure 7A:
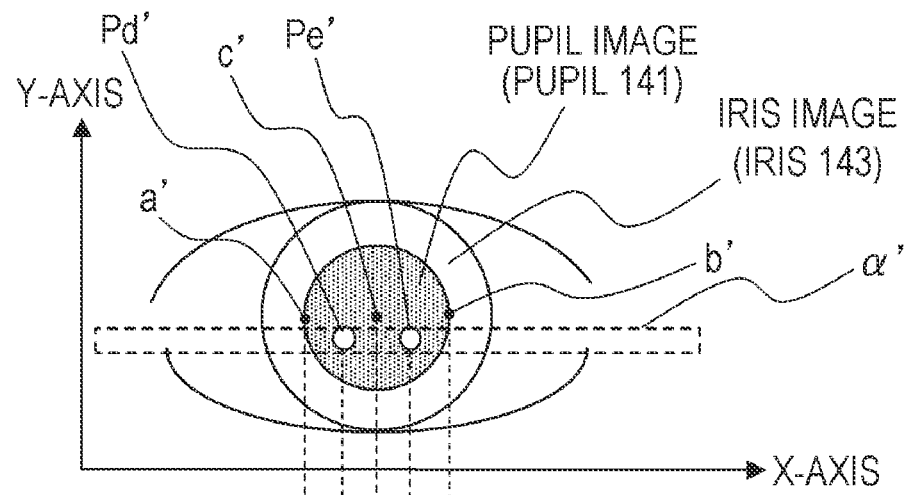
FIGS. 7A and 7B are diagrams showing an eye image according to the present embodiment.
Figure 7B:
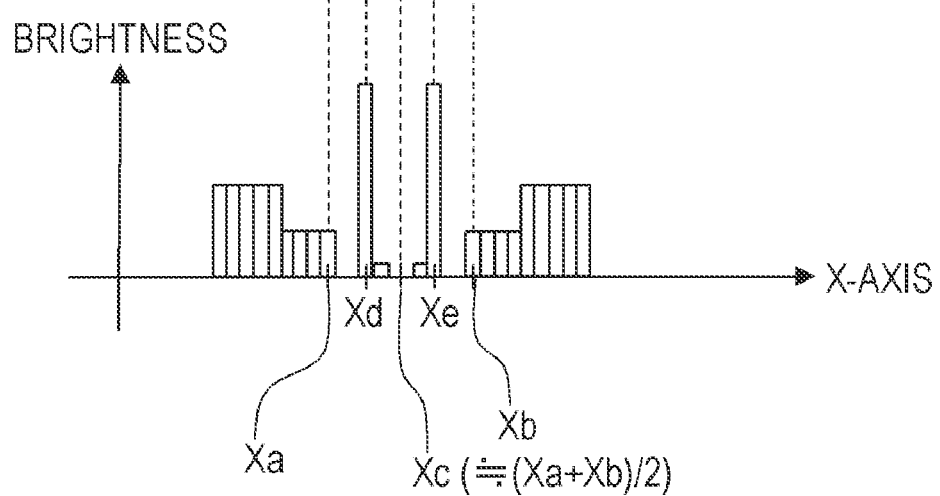

FIG. 7A is a schematic view of an eye image captured by the line-of-sight detection sensor 30 (eyeball image projected on the line-of-sight detection sensor 30). FIG. 7B is a diagram showing the output intensity of the line-of-sight detection sensor 30 (such as a CCD). FIG. 8 shows a schematic flowchart of a line-of-sight detection operation.

When a line-of-sight detection operation starts, at step S801 of FIG. 8, the infrared LEDs 26 and 27 emit infrared light toward the user's eyeball 140 with an emission intensity E2 for line-of-sight detection, in response to an instruction from the light-source drive unit 205.

At step S802, the CPU 3 starts obtaining an eye image by the line-of-sight detection sensor 30. A pupil image and corneal reflection image of the user's eye illuminated by infrared light are formed near the line-of-sight detection sensor 30 via the line-of-sight imaging lens 29 (light-receiving lens) and photoelectrically converted by the line-of-sight detection sensor 30. A processable electric signal of the eye image is thus obtained. Eye images are continually obtained at regular intervals.

At step S803, the line-of-sight detection unit 201 (line-of-sight detection circuit) sends the eye image (eye image signal; electric signal of the eye image) obtained from the line-of-sight detection sensor 30 to the CPU 3.

At step S804, the CPU 3 obtains the coordinates of the point corresponding to the pupil center c from the eye image obtained at step S802.

At step S805, the CPU 3 obtains the coordinates of the two points corresponding to corneal reflection images Pd and Pe of the infrared LEDs 26 and 27.

The infrared light emitted from the infrared LEDs 26 and 27 illuminates the cornea 142 of the user's eyeball 140. At this time, the corneal reflection images Pd and Pe formed by part of the infrared light reflected on the surface of the cornea 142 are collected by the line-of-sight imaging lens 29 and form corneal reflection images Pd' and Pe' in the eye image on the line-of-sight detection sensor 30. Similarly, the light from edge points a and b of the pupil 141 also forms pupil edge images a' and b' in the eye image on the line-of-sight detection sensor 30.

FIG. 7B shows the brightness information (brightness distribution) of a region α' in the eye image of FIG. 7A. In FIG. 7B, the horizontal direction of the eye image is the X-axis direction, the vertical direction is the Y-axis direction, and the brightness distribution in the X-axis direction is shown. In the present embodiment, the X coordinates (coordinates in the X-axis direction (horizontal direction)) of the corneal reflection images Pd' and Pe' are Xd and Xe, and the X coordinates of the pupil edge images a' and b' are Xa and Xb. As shown in FIG. 7B, extremely high levels of brightness are obtained at the X coordinates Xd and Xe of the corneal reflection images Pd' and Pe'. In the region from the X coordinate Xa to the X coordinate Xb, which corresponds to the region of the pupil 141 (the region of the pupil image formed by the light from the pupil 141 on the line-of-sight detection sensor 30), the brightness levels are extremely low except for the X coordinates Xd and Xe. In the region of the iris 143 outside the pupil 141 (the region of the iris image outside the pupil image formed by the light from the iris 143), brightnesses between the above two types of brightness is obtained. Specifically, in the region where the X coordinate is smaller than the X coordinate Xa and the region where the X coordinate is greater than the X coordinate Xb, brightnesses between the above two types of brightness are obtained.

From the brightness distribution as shown in FIG. 7B, the X-coordinates Xd and Xe of the corneal reflection images Pd' and Pe' and the X-coordinates Xa and Xb of the pupil edge images a' and b' can be obtained. Specifically, the coordinates with extremely high brightness are obtained as the coordinates of the corneal reflection images Pd' and Pe', and the coordinates with extremely low brightness are obtained as the coordinates of the pupil edge images a' and b'. Furthermore, when the rotation angle θx of the optical axis of the eyeball 140 with respect to the optical axis of the line-of-sight imaging lens 29 is small, the X coordinate Xc of the pupil center image c' (center of the pupil image) that is formed on the line-of-sight detection sensor 30 by the light from the pupil center c is expressed by Xc≈(Xa+Xb)/2. That is, the X coordinate Xc of the pupil center image c' can be calculated from the X coordinates Xa and Xb of the pupil edge images a' and b'. The X-coordinates of the corneal reflection images Pd' and Pe' and the X-coordinates of the pupil center image c' are thus estimated.

The CPU 3 also calculates the Y coordinate (coordinates in the Y-axis direction (vertical direction)) in the same manner and obtains the coordinates of the pupil center image c' (Xc, Yc), the coordinates of the corneal reflection image Pd' (Xd, Yd), and the coordinates (Xe, Ye) of the corneal reflection image Pe'.

At step S806, the CPU 3 calculates the imaging magnification D of the eyeball image. The imaging magnification β is a magnification determined by the position of the eyeball 140 with respect to the line-of-sight imaging lens 29, and can be obtained by using a function of the interval (Xd−Xe) between the corneal reflection images Pd' and Pe'.

At step S807, the CPU 3 calculates the rotation angle of the optical axis of the eyeball 140 with respect to the optical axis of the line-of-sight imaging lens 29. The X coordinate of the midpoint between the corneal reflection images Pd and Pe is substantially equal to the X coordinate of the center of curvature O of the cornea 142. As such, when a standard distance from the center of curvature O of the cornea 142 to the center c of the pupil 141 is Oc, the rotation angle θx of the eyeball 140 in the ZX plane (plane perpendicular to the Y-axis) is obtained by Expression 1 below. In addition, the rotation angle θy of the eyeball 140 in the ZY plane (plane perpendicular to the X-axis) can also be calculated by the same method as for the rotation angle θx.

$$\beta \times Oc \times \text{SIN } \theta x \approx \{(Xd+Xe)/2\} - Xc \quad \text{(Expression 1)}$$

At step S808, the CPU 3 uses the rotation angles θx and θy calculated at step S807 to obtain (estimate) the user's line-of-sight point (viewed point; position where the eye is focused, the position where the user is looking) in the image for visual perception displayed on the display panel 6. Assuming that the coordinates of the line-of-sight point (Hx, Hy) are the coordinates corresponding to the pupil center c, the coordinates of the line-of-sight point (Hx, Hy) can be calculated by the following Expressions 4 and 5 (or Expressions 4' and 5').

At step S809, the CPU 3 stores the coordinates of the line-of-sight point (Hx. Hy) in the memory unit 4 and ends the line-of-sight detection operation.

When the eye is far from a predetermined position (the optical axis of the eyepiece optical system 16 in this embodiment), or when the number of corneal reflection images in the eye image differs from a predetermined number (the number of the infrared LEDs that apply light), the line-of-sight detection accuracy is reduced.

An example is now described in which the number of corneal reflection images is less than the predetermined number. The user's eyelids or eyelashes may block the infrared light that is emitted from the infrared LEDs 26 and 27 and reflected on the surface of the cornea 142, before the light forms images on the line-of-sight detection sensor 30. In this case, the number of corneal reflection images will be less than two because the corneal reflection image corresponding to the blocked infrared light is not formed. When the number of corneal reflection images is not more than one, the imaging magnification β cannot be calculated, reducing the line-of-sight detection accuracy. Such reduction in the line-of-sight detection accuracy can be avoided if the user opens the eyelids wide so that the eyelids or eyelashes do not block the infrared light.

An example is now described in which the number of corneal reflection images is more than the predetermined number. When the user wears eyeglasses, depending on the position and orientation of the eyeglasses, infrared light is reflected on the incident surface (front surface) or the emission surface (back surface) of the eyeglass lens. This may create a false image in the eye image. If the false image is erroneously detected as a corneal reflection image, the number of corneal reflection images (detected number) will be more than two. As a result, a wrong line of sight would be detected based on the coordinates of the false image (the line-of-sight detection accuracy is reduced). Such reduction in the line-of-sight detection accuracy can be avoided if the user adjusts the position and orientation of the eyeglasses such that a false image does not occur in an area in which the false image is erroneously detected as a corneal reflection image.

As described above, the accuracy of line-of-sight detection can be reduced by various factors, and there are various methods to avoid such reduction in the line-of-sight detection accuracy (methods of adjusting the viewing state in which the display panel 6 is visually perceived). For this reason, the present embodiment advantageously notifies of a method of adjusting the viewing state. Notification can be given in various manners, such as through display, audio, or a combination of display and audio, and the present embodiment is an example in which notification is given through display on the display panel 6.

Description of Calibration Operation

Referring to FIGS. 9 and 10A to 10J, a calibration operation and a notification operation are described. FIG. 9 shows a schematic flowchart of a calibration operation, and FIGS. 10A to 10J show examples of display images and eye images. Lines of sight vary among different individuals, and such personal differences need to be considered to accurately detect a line of sight. A calibration operation is therefore needed to take the personal differences into consideration. The calibration operation is an operation for obtaining a correction value based on the personal characteristics of the line of sight of a user. The calibration operation is performed before the line-of-sight detection operation of FIG. 8. The notification operation is an operation of notifying of a method of adjusting the viewing state. In the present embodiment, a notification operation is performed during a calibration operation in the expectation that the user would be accustomed to how to use the camera 1 (how to look at the display panel 6; how to look into the viewfinder) before the line-of-sight detection operation of FIG. 8. Nevertheless, a notification operation may be performed during the line-of-sight detection operation of FIG. 8.

Figure 10A:

When a calibration operation starts, at step S901 of FIG. 9, the CPU 3 displays a target or an instruction for calibration on the display panel 6. For example, as shown in FIG. 10A, a target 1002 to be viewed (gazed) by the user and an instruction 1003 notifying that the user should look at the target 1002 and an ideal viewing state (viewing method) are displayed. A display area 1001 is the display area (region on the display surface) of the display panel 6.

Steps S902 to S905 are the same as steps S801 to S804 in FIG. 8. At step S905, when there are no coordinates with extremely low brightness in the eye image, the CPU 3 determines that the detection (calculation) of the coordinates (Xc. Yc) of the pupil center image c' (the center of the pupil image) is impossible.

At step S906, the CPU 3 determines whether the pupil image is captured in the eye image, specifically, whether the coordinates (Xc, Yc) of the pupil center image c' can be detected. If it is determined that the pupil image is captured (the coordinates (Xc, Yc) can be detected), the process proceeds to step S908. If not, the process proceeds to step S907.

Figure 10C:
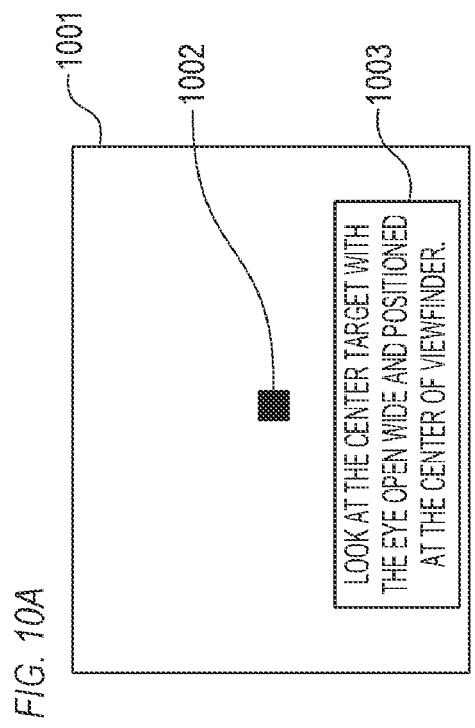
FIGS. 10C, 10D, 10F, and 10H are diagrams showing eye images according to the present embodiment.
Figure 10B:
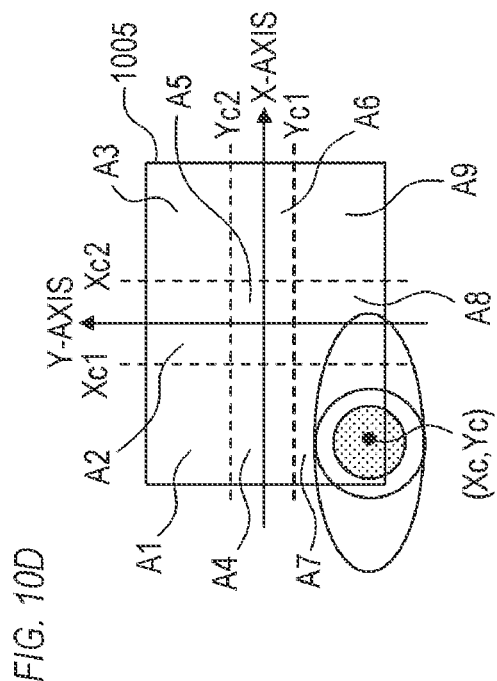

At step S907, the CPU 3 updates the display on the display panel 6 to notify that the eye should be moved to a predetermined position. For example, as shown in FIG. 10B, an instruction 1004 is displayed notifying that the eye should be translationally moved to the central axis of the display panel 6 (the central axis perpendicular to the display surface) or to the optical axis of the eyepiece optical system 16, that is, to the center of the viewfinder. In this situation, as shown in FIG. 10C, the pupil image is not shown in the eye image because the pupil image is located outside the field area 1005 (imaging area) of the line-of-sight detection sensor 30, for example. In this case, since it is difficult to determine the position of the pupil image, the CPU 3 only notifies of the target position of the eye and does not notify of a moving direction of the eye.

At step S908, the CPU 3 determines whether the pupil image is captured within a predetermined area in the eye image, specifically, determines whether the coordinates (Xc, Yc) of the pupil center image c' are detected within the predetermined area. If it is determined that the pupil image is captured within the predetermined area (the coordinates (Xc. Yc) are detected within the predetermined area), the process proceeds to step S910. If not, or if it is determined that the pupil image is not captured within the predetermined area (the coordinates (Xc. Yc) are not detected within the predetermined area; the pupil image is captured outside the predetermined area; the coordinates (Xc, Yc) are detected outside the predetermined area), the process proceeds to step S909.

Figure 10D:
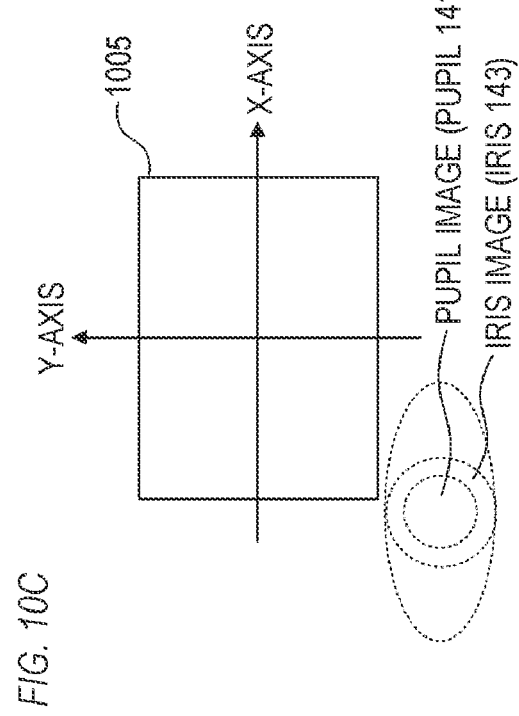

In the present embodiment, as shown in FIG. 10D, the field area 1005 of the line-of-sight detection sensor 30 is divided (classified) into nine regions A1 to A9 with threshold values Xc1 and Xc2 of the X coordinate and threshold values Yc1 and Yc2 of the Y coordinate used as boundaries.

A step S908, the CPU 3 determines whether Xc1≤Xc≤Xc2 and Yc1≤Yc≤Yc2. Then, if Xc1≤Xc≤Xc2 and Yc1≤Yc≤Yc2, that is, if the coordinates (Xc, Yc) are detected in the central region A5, the process proceeds to step S910. If Xc1≤Xc≤Xc2 and Yc1≤Yc≤Yc2 are not satisfied, that is, if the coordinates (Xc, Yc) are detected in one of the areas A1 to A4 and A6 to A9 other than the area A5, the process proceeds to step S909.

Even when the user maintains the position and orientation of the face (posture) so that the eye is located in the center of the viewfinder, a rotation of the users eyeball will move the pupil image and change the coordinates (Xc, Yc). Since the coordinates (Xc, Yc) thus changed still correspond to an appropriate viewing state, it is not desirable to prompt the user to translationally move the eye. For this reason, the threshold values Xc1, Xc2, Yc1, and Yc2 are preferably determined such that a region including the changed coordinates (Xc, Yc) is set as the region A5.

Figure 10E:
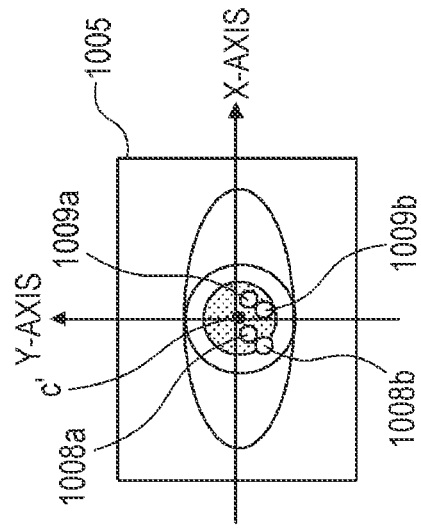

At step S909, the CPU 3 updates the display on the display panel 6 to notify that the eye should be moved to a predetermined position, as at step S907. Here, the CPU 3 can determine the direction from the pupil image to the predetermined area based on the coordinates (Xc, Yc) of the pupil center image c'. Specifically, the CPU 3 determines the direction to the region A5 from the region among the regions A1 to A4 and A6 to A9 in which the coordinates (Xc, Yc) are detected. The CPU 3 can also determine the moving direction of the eye to a predetermined position (center of the viewfinder) corresponding to the determined direction. The CPU 3 thus updates the display on the display panel 6 such that the determined moving direction is also indicated. For example, as shown in FIG. 10E, an instruction 1006 notifying that the eye should be translationally moved in the determined moving direction and an arrow 1007 indicating the determined moving direction are displayed. In the state of FIG. 10D, that is, when the coordinates (Xc, Yc) are detected in the region A7, the instruction 1006 and the arrow 1007 for moving the eye to the upper right are displayed as shown in FIG. 10E.

Step S910 is the same as step S805 of FIG. 8. At step S910, the CPU 3 further counts the number of corneal reflection images (detected number) in the eye image.

At step S911, the CPU 3 compares the number of corneal reflection images (detected number) in the eye image with a predetermined number. The predetermined number is the number of infrared LEDs emitting light (the number of applied rays of infrared light). The predetermined number is 2 when only the infrared LEDs 26 and 27 emit light. If it is determined that the detected number is equal to the number of applied rays, the process proceeds to step S916. If it is determined that the detected number is greater than the number of applied rays, the process proceeds to step S912. If it is determined that the detected number is less than the number of applied rays, the process proceeds to step S915.

At step S912, the CPU 3 updates the display on the display panel 6 to notify that the eyeglasses should be moved to identify false images (false corneal reflection images).

Figure 10F:
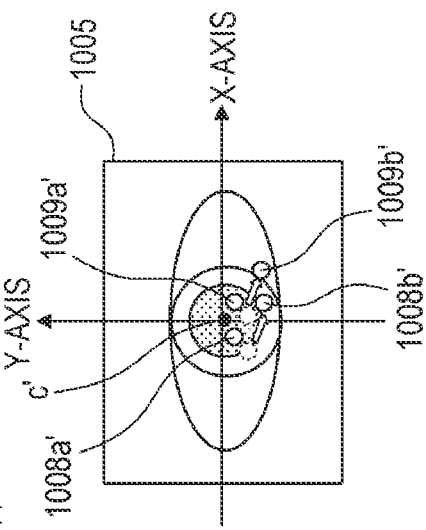

Here, the detected number of corneal reflection images is greater than the predetermined number (the number of applied rays of infrared light). FIG. 10F shows an example of an eye image in which the detected number of corneal reflection images is greater than the number of applied rays of infrared light. In FIG. 10F, the images 1008a and 1009a are corneal reflection images formed on the line-of-sight detection sensor 30 by the infrared light that is emitted by the infrared LEDs 26 and 27 and reflected only on the corneal surface of the eye without being reflected on the lens of the user's eyeglasses. The images 1008*a* and 1009*a* are therefore necessary for line-of-sight detection. The images 1008*b* and 1009*b* are false images that are formed on the line-of-sight detection sensor 30 by the infrared light that is emitted by the infrared LEDs 26 and 27 and reflected on the lens of the user's eyeglasses. The images 1008*b* and 1109*b* are therefore unnecessary for line-of-sight detection. The false images 1008*b* and 1009*b*, which are similar in size and brightness to the corneal reflection images 1008*a* and 1009*a*, are likely to be erroneously detected as corneal reflection images. When such erroneous detection occurs, the false images cannot be easily identified (distinguished) among the images 1008*a*, 1009*a*, 1008*b*, and 1009*b* detected as the corneal reflection image, even if the single eye image is analyzed in detail.

Figure 10G:
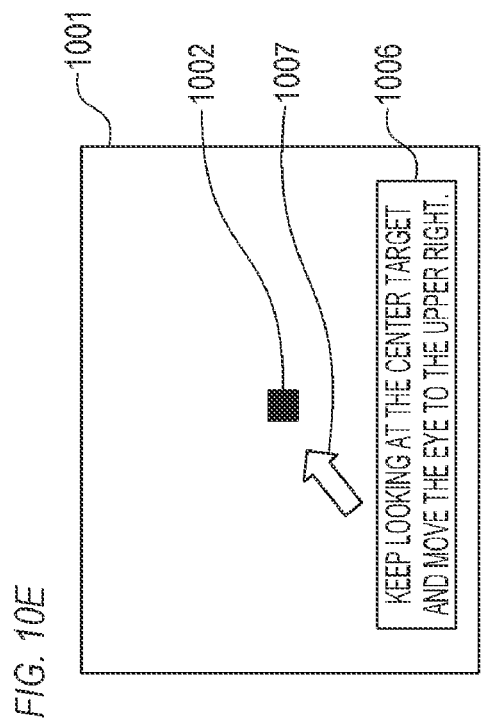

For this reason, at step S912, the CPU 3 displays an instruction 1010 notifying that only the eyeglasses should be moved without moving the eye (the position and orientation of only the eyeglasses should be changed) as shown in FIG. 10G.

Figure 10H:
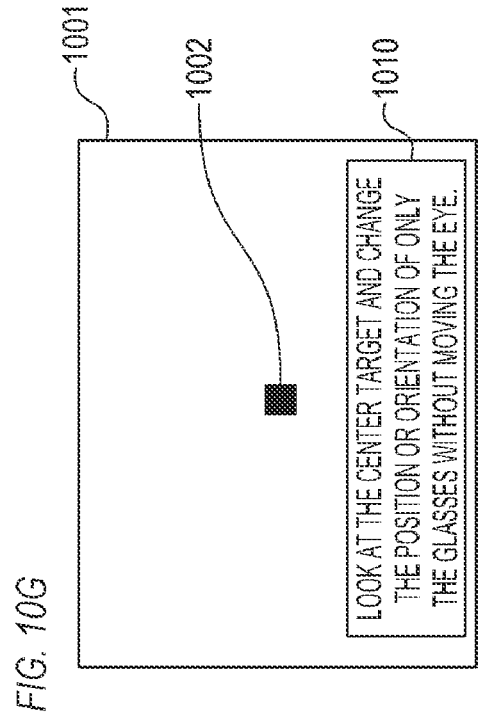

At step S913, the CPU 3 identifies (distinguishes) the false images among the detected corneal reflection images, based on a plurality of eye images. FIG. 10H shows an example of an eye image obtained after the user moves only the eyeglasses in response to the instruction 1010 of FIG. 10G As shown in FIG. 10H, when only the eyeglasses are moved, the moving distances of the corneal reflection images that are not false images are small, and the moving distances of the false images are large. The false images are thus identified by detecting the movements of the detected corneal reflection images from multiple eye images.

Specifically, the CPU 3 uses characteristic tracking, which is a known image analysis technique, to determine the correspondence regarding images (images that are detected as corneal reflection images) between the eye image obtained before the eyeglasses are moved, and the eye image obtained after the eyeglasses are moved. Here, it is assumed that the eye image obtained before the eyeglass movement is the eye image of FIG. 10F, and the eye image obtained after the eyeglass movement is the eye image of FIG. 10H. In this case, it is determined that the image 1008*a*' of FIG. 10H corresponds to the image 1008*a* of FIG. 10F, the image 1009*a*' corresponds to the image 1009*a*, the image 1008*b*' corresponds to the image 1008*b*, and the image 1009*b*' corresponds to the image 1009*b*.

Based on the coordinates of the images before and after the eyeglass movement, the CPU 3 calculates the amount of movement (movement distance) of each image caused by the eyeglass movement.

Then, the CPU 3 identifies the images 1008*a*' and 1009*a*' whose movement distances are not more than a predetermined distance as corneal reflection images, and identifies the images 1008*b*' and 1009*b*' whose movement distances are longer than the predetermined distance as false images.

At step S914, the CPU 3 updates the display on the display panel 6 to notify that the eyeglasses should be moved to remove false images. For example, as shown in FIG. 10I, items 1008*b*" and 1009*b*" corresponding to the identified false images 1008*b*' and 1009*b*', respectively, and item 1005" of the area corresponding to the area of the eye image are displayed. The positions of the items 1008*b*" and 1009*b*" relative to the area of the item 1005" correspond to the positions of the false images 1008*b*' and 1009*b*' relative to the field area 1005 in FIG. 10H. When the false images 1008*b*' and 1009*b*' move, the items 1008*b*" and 1009*b*" also move. Then, when the eyeglasses are moved such that the items 1008*b*" and 1009*b*" move out of the area of the item 1005", the false images 1008*b*' and 1009*b*' and thus the items 1008*b*" and 1009*b*" disappear. To this end, as shown in FIG. 10I, an instruction 1011 is also displayed notifying that the eyeglasses should be moved to move the items 1008*b*" and 1009*b*" out of the area of the item 1005".

At step S915, the CPU 3 updates the display on the display panel 6 to notify that the opening of the eyelids should be widened. For example, as shown in FIG. 10J, an instruction 1012 and a graphic 1013 are displayed to notify that the opening of the eyelids should be widened. In general, closing the eyelids of one eye reduces the opening of the eyelids of the other eye. Accordingly, when the eyelids of the eye that is not looking into the viewfinder is closed, the opening of the eyelids of the eye looking into the viewfinder tends to be small. For this reason, as shown in FIG. 10J, the instruction 1012 is displayed to notify that the eyelids of both eyes should be opened wider (the eyelids of both eyes should be opened). In addition, a graphic 1014 is displayed for such notification.

Steps S916 and S917 are the same as steps S806 and S807 of FIG. 8.

At step S918, the CPU 3 obtains (estimates) the user's line-of-sight point in the image for visual perception displayed on the display panel 6 using the rotation angles θx and θy calculated at step S917. This step obtains a line-of-sight point that does not reflect the result of the calibration operation (correction value), that is, a line-of-sight point that does not reflect the personal characteristics of the user's line of sight. The coordinates (H'x, H'y) of such a line-of-sight point can be calculated by the following Expressions 2 and 3.

$$H'x = m \times \theta x \qquad \text{(Expression 2)}$$

$$H'y = m \times \theta yz \qquad \text{(Expression 3)}$$

The parameter m in Expressions 2 and 3 is a constant determined by the configuration of the viewfinder optical system (e.g., the line-of-sight imaging lens 29) of the camera 1. The parameter m is a conversion coefficient that converts the rotation angles θx and θy into coordinates corresponding to the pupil center c in the image for visual perception. The parameter m is determined in advance and stored in the memory unit 4.

At step S919, the CPU 3 obtains correction values Bx, By and using the coordinates (H'x, H'y) calculated at step S918.

The coordinates (Hx, Hy) of the line-of-sight point that reflects the result of the calibration operation (correction values Bx, By), that is, the line-of-sight point that reflects the personal characteristics of the user's line of sight are expressed by the following Expressions 4 and 5.

$$Hx = m \times (\theta x + Bx) \qquad \text{(Expression 4)}$$

$$Hy = m \times (\theta y + By) \qquad \text{(Expression 5)}$$

Here, the user should be gazing at the target 1002 shown in FIG. 10A, for example, and the target 1002 is displayed in the center of the display area 1001. Accordingly, the coordinates (Hx, Hy) of the correct line-of-sight point are (0, 0). Thus, the correction value Bx, which is equal to –H'x/m, and the correction value By, which is equal to –H'y/m, can be obtained based on the coordinates (Hx, Hy)=(0, 0) and Expressions 2 to 5.

At step S920, the CPU 3 stores the correction values Bx and By obtained at step S918 in the memory unit 4, and ends the calibration operation.

In the foregoing example, the target 1002 displayed in the center of the display area 1001 is used as the target to be viewed by the user in the calibration operation. However, the position of the target to be viewed by the user is not limited to the center of the display area 1001. For example, the target to be viewed by the user may be displayed at a position deviated from the center of the display area 1001 in any of the up, down, left, and right directions.

A plurality of targets to be viewed by the user may be displayed in sequence or together so that the user can look at a plurality of positions in sequence. In this case, Expressions 4 and 5 used (considered) at steps S808 and S919, for example, may be replaced by the following Expressions 4' and 5'.

$$Hx = m \times (Ax \times \theta x + Bx) \quad \text{(Expression 4')}$$

$$Hy = m \times (Ay \times \theta y + By) \quad \text{(Expression 5')}$$

In this case, at step S918, the CPU 3 calculates the coordinates (H'x, H'y) of the line-of-sight point for each of the plurality of targets to be viewed by the user. At step S919, the CPU 3 calculates correction values Ax, Ay, Bx, and By such that the error of the coordinates (Hx, Hy) of the line-of-sight point (difference between the coordinates (Hx, Hy) and the correct coordinates) is minimized for each of the targets. At step S920, the CPU 3 stores the correction values Ax, Ay, Bx, and By in the memory unit 4. The calibration operation described above allows for line-of-sight detection with higher accuracy.

As described above, the present embodiment gives notification of a method of adjusting the viewing state in which the display unit is visually perceived, based on at least one of the position of the pupil image in the eye image and the number of corneal reflection images (detected number) in the eye image. As a result, the user can easily adjust the position of the eye (the position and orientation of the face), the position of the eyeglasses, the orientation of the eyeglasses, or the like, and it is thus possible to perform line-of-sight detection with high accuracy.

Modification

In the above-described embodiment, the configuration in which the line of sight of the user looking at the front and the optical axis of the optical system for detecting the line of sight coincide with each other has been exemplified, but the present disclosure is not limited thereto. For example, as the line-of-sight detection tyep, a so-called off-axis line-of-sight detection method (type) may be adopted in which the line-of-sight of the user looking at the front and the imaging axis of the eyeball image related to the line-of-sight detection are different. That is, a method may be adopted in which the user's eyeball is directly detected by the line-of-sight detection unit without passing through another optical system. In this case, the configuration may be such that the line-of-sight detection sensor that captures the user's eyeball image without passing through the eyepiece optical system 16 described above is arranged outside the optical axis of the eyepiece optical system 16 and the user's eyeball viewing the display panel 6 described above is captured from an oblique direction with respect to the optical axis.

Hereinafter, a modification using a method of directly detecting the line of sight of the user without using the optical-path dividing prism unit 11 will be described. Since the basic configuration and basic driving method of the camera 1 which is the image pickup apparatus according to the present modification are substantially the same as those in the above-described embodiment, the reference numerals to the respective units are the same, and the description thereof will be omitted. In the present modification, a configuration different from the above-described embodiment will be described in detail below.

Figure 11:
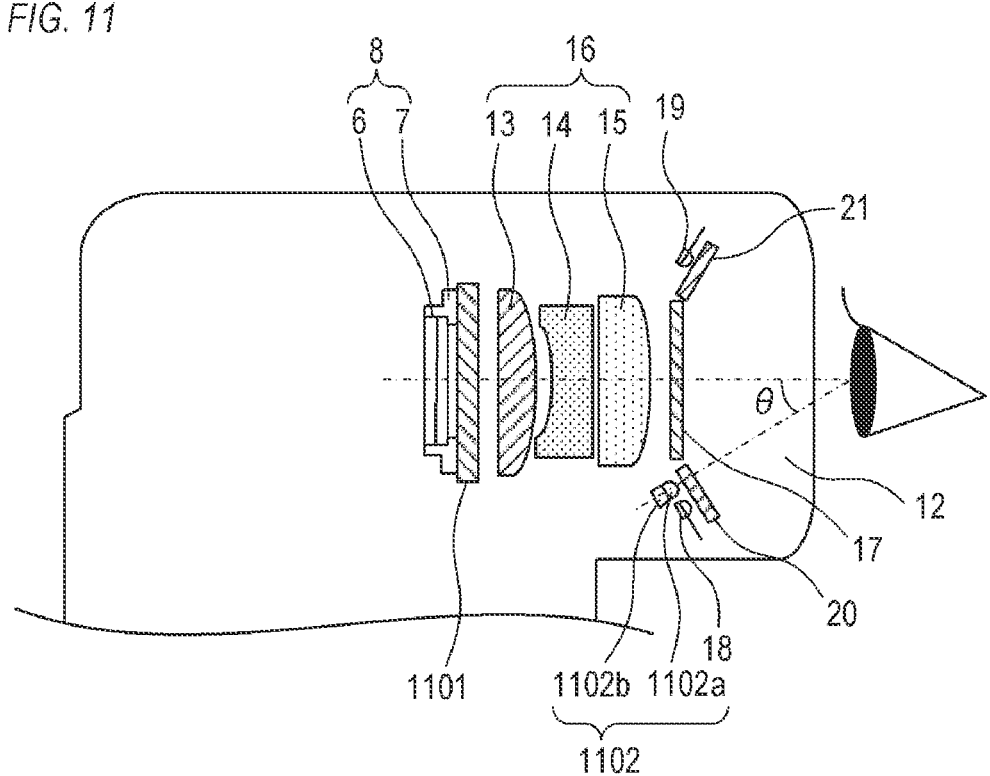
FIG. 11 is a cross-sectional view of a camera according to a modification.

FIG. 11 is an example of a cross-sectional view of the camera 1 according to the present modification. In FIG. 11, a cover glass 1101 is arranged on the display panel unit 8. That is, the present modification is different from the above-described embodiment in that the optical-path dividing prism unit 11 (optical-path dividing member) is excluded from the inside of the camera 1 and the cover glass 1101 is newly provided. The cover glass 1101 is a transparent glass member, and the thickness of the cover glass 1101 in the optical axis direction of the EVF portion can be reduced as compared with the optical-path dividing prism 11 in the above-described embodiment. Therefore, in the camera 1 according to the present modification, by bringing the eyepiece optical system 16 close to the display panel unit 8, the display magnification of the eyepiece optical system 16 can be increased, and the optical performance can be improved.

Further, as shown in FIG. 11, a line-of-sight detection module 1102 formed by a line-of-sight imaging lens 1102a and a line-of-sight detection sensor 1102b is arranged alongside the infrared LED 18. The line-of-sight detection module 1102 is arranged at a predetermined angle θ with respect to the optical axis of the eyepiece optical system 16 (that is, the optical axis of the EVF portion), and can directly capture the photographer's eyeball through the illumination window 20. In the present modification, it is assumed that the angle formed by the optical axis of the line-of-sight imaging lens 1102a and the optical axis of the eyepiece optical system 16 is the predetermined angle θ.

Here, since the line-of-sight detection module 1102 in the present modification captures the eyeball of the object without passing through the eyepiece optical system 16, the size and position of the eyeball image projected on the line-of-sight detection sensor 1102b change according to the distance between the line-of-sight detection module 1102 and the photographer's eyeball.

Further, in a case where the line-of-sight detection module 1102 is located on the bottom side of the photographer's eyeball as in the present modification, the eyeball image moves in the up-down direction while the magnification of the eyeball image formed on the line-of-sight detection sensor 1102b changes according to the distance to the photographer's eyeball. The side of the camera 1 where the EVF portion is arranged is the upper side. Therefore, the imaging area 1201 (FIGS. 12A and 12B) of the line-of-sight detection sensor 1102b in the present modification is expanded in the up-down direction as compared with the above-described embodiment. If the line-of-sight detection module 1102 is arranged on the left or right side of the photographer's eyeball, since the eyeball image moves in the left-right direction depending on the distance from the photographer's eyeball, it is desirable that the imaging area is expanded in the left-right direction.

Figure 12A:
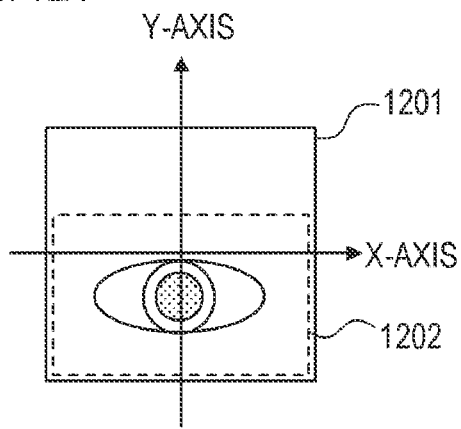
FIGS. 12A and 12B are diagrams showing an eye image according to the modification.
Figure 12B:
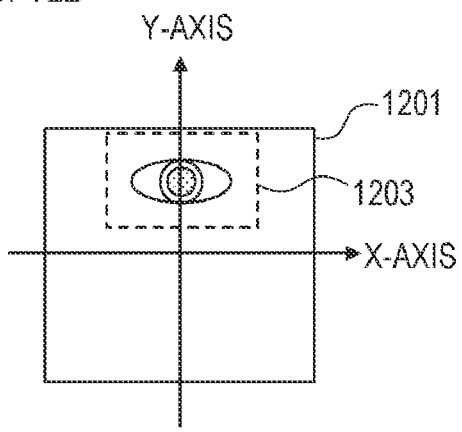

FIGS. 12A and 12B are diagrams illustrating an eyeball image of a photographer formed on the line-of-sight detection sensor 1102b according to the present modification. FIG. 12A shows a case where the photographer's eyeball is close to the line-of-sight detection sensor 1102b, and FIG. 12B shows a case where the photographer's eyeball is far from the line-of-sight detection sensor 1102b. That is, as shown in FIGS. 12A and 12B, depending on the distance between the line-of-sight detection sensor 1102b and the photographer (eyeball), the ratio of the eyeball image to the eye image used for detection and the position of the eyeball image in the eye image is also changed.

So, in the present modification, as shown in FIGS. 12A and 12B, depending on the distance between the line-of-sight detection sensor 1102b and the photographer (eyeball), the area in which the eyeball is detected, on the line-of-sight sensor 1102b is changed to an area 1202 or an area 1203. That is, in the present modification, the presence or absence of an eyeball image within the above-mentioned area is detected, and various notifications as in the above-described embodiment are displayed to the user. The distance between the line-of-sight detection sensor 1102b and the photographer may be calculated based on the imaging magnification D calculated by using the corneal reflection images as in the above-described embodiment, or may be estimated based on the size of the iris portion in the eyeball image.

The above-described embodiments (including modifications) are merely examples, and the present disclosure also includes configurations obtained by appropriately modifying or changing the above-described configurations within the scope of the present disclosure. The present disclosure also includes configurations obtained by appropriately combining the above-described configurations. For example, in the above-described embodiment (including modifications), the configuration in which the line-of-sight detection unit is provided in the EVF portion provided in the image pickup apparatus has been described, but the present disclosure is not limited to this. The electronic device provided (combined with) the line-of-sight detection unit described above may be any device such as a head-mounted display.

The present disclosure allows a user to easily adjust the position of the face, the orientation of the face, the position of the eyeglasses, the orientation of the eyeglasses, or the like, and it is thus possible to perform line-of-sight detection with high accuracy.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^{TM}$), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-085960, filed on May 15, 2020, and Japanese Patent Application No. 2021-052724, filed on Mar. 26, 2021, which are hereby incorporated by reference herein in their entirety.

What is claimed is:

1. An electronic device configured to obtain an eye image representing an eye that is captured when looking at a display, the electronic device comprising:
   at least one memory storing instructions; and
   at least one processor which executes the stored instructions causing the at least one processor to:
   detect a plurality of corneal reflection images from the eye image, wherein the plurality of corneal reflection images are respectively formed by reflection of light from a plurality of light sources on a cornea;
   perform line-of-sight detection, based on the obtained eye image;
   count a number of detected corneal reflection images;
   determine whether or not the counted number of the detected corneal reflection images satisfies a predetermined condition; and
   provide a predetermined notification regarding a method of adjusting a viewing state in which the display is visually perceived, according to a result of the determination.

2. The electronic device according to claim 1, wherein the predetermined notification is provided based on the eye image obtained during a calibration operation relating to the line-of-sight detection.

3. The electronic device according to claim 1, wherein in a case where a pupil image is not captured within a predetermined area in the eye image, a notification that the eye is to be moved to a predetermined position corresponding to the predetermined area is provided as the predetermined notification.

4. The electronic device according to claim 3, wherein in a case where the pupil image is captured outside the predetermined area, a notification of a moving direction indicating a direction that the eye is to be moved to reach to the predetermined position is further provided as the predetermined notification, with the moving direction corresponding to a direction from the pupil image to the predetermined area.

5. The electronic device according to claim 4, wherein the notification of the moving direction includes display of an arrow on the display.

6. The electronic device according to claim 1, wherein the stored instructions further causes the at least one processor to determine whether the number of corneal reflection images is less than a predetermined number and control the predetermined notification to vary notification content depending on a result of the determination.

7. The electronic device according to claim 6, wherein in a case where the number of corneal reflection images is less than the predetermined number, a notification of a content regarding a degree of opening of an eyelid is provided as the predetermined notification.

8. The electronic device according to claim 7, wherein the content regarding a degree of opening of an eyelid is a content about widening the opening of the eyelid.

9. The electronic device according to claim 6, wherein in a case where the number of corneal reflection images is greater than a predetermined number, a notification of a content regarding movement of eyeglasses is provided as the predetermined notification.

10. The electronic device according to claim 9, wherein the stored instructions further causes the at least one processor to, after providing the notification of the content regarding movement of eyeglasses, display, on the display, a first item corresponding to a corneal reflection image that has moved by a distance that is longer than a predetermined distance and a second item of an area corresponding to an area of the eye image, and provide a notification that the eyeglasses is be moved to move the first item out of the area of the second item.

11. The electronic device according to claim 1, wherein a state during the calibration operation relating to line-of-sight detection is a state in which an item for calibration is displayed on the display.

12. The electronic device according to claim 1, further comprising a line-of-sight detection sensor, wherein the line-of-sight detection sensor obtains the eye image based on an optical image incident through an optical system for the display, the optical system being provided between the display and an eyepiece.

13. The electronic device according to claim 1, further comprising a line-of-sight detection sensor, wherein the line-of-sight detection sensor obtains the eye image based on an incident optical image without passing through an optical system for the display, the optical system being provided between the display and an eyepiece, and the stored instructions further causes the at least one processor to change a range of the eye image for performing the line-of-sight detection according to information regarding a distance between the line-of-sight detection sensor and a photographer.

14. The electronic device according to claim 1, wherein the method of adjusting the viewing state is determined based on the number of corneal reflection images in the eye image.

15. The electronic device according to claim 2, wherein the calibration operation is an operation for obtaining a correction value to be used in the line-of-sight detection.

16. The electronic device according to claim 1, wherein coordinates of a plurality points correspond to the plurality of corneal reflection images from the eye image.

17. The electronic device according to claim 1, wherein the plurality of corneal reflection images are detected from the eye image by detecting coordinates with high brightness of the eye image.

18. A control method of an electronic device configured to obtain an eye image representing an eye that is captured when looking at a display, the control method comprising:

detecting a plurality of corneal reflection images from the eye image, wherein the plurality of corneal reflection images are respectively formed by reflection of light from a plurality of light sources on a cornea;

performing line-of-sight detection, based on the obtained eye image;

count a number of detected corneal reflection images;

determining whether or not the counted number of the detected corneal reflection images satisfies a predetermined condition; and providing a predetermined notification regarding a method of adjusting a viewing state in which the display is visually perceived, according to a result of the determination.

19. A non-transitory computer readable medium that stores a program, wherein the program causes a computer to execute a control method of an electronic device configured to obtain an eye image representing an eye that is captured when looking at a display, the control method comprising:

detecting a plurality of corneal reflection images from the eye image, wherein the plurality of corneal reflection images are respectively formed by reflection of light from a plurality of light sources on a cornea;

performing line-of-sight detection, based on the obtained eye image;

count a number of detected corneal reflection images;

determining whether or not the counted number of the detected corneal reflection images satisfies a predetermined condition; and providing a predetermined notification regarding a method of adjusting a viewing state in which the display is visually perceived, according to a result of the determination.

* * * * *